Nov. 28, 1933.  J. H. HARDY  1,936,788
SHOCK ABSORBER
Filed Feb. 19, 1931   2 Sheets-Sheet 1
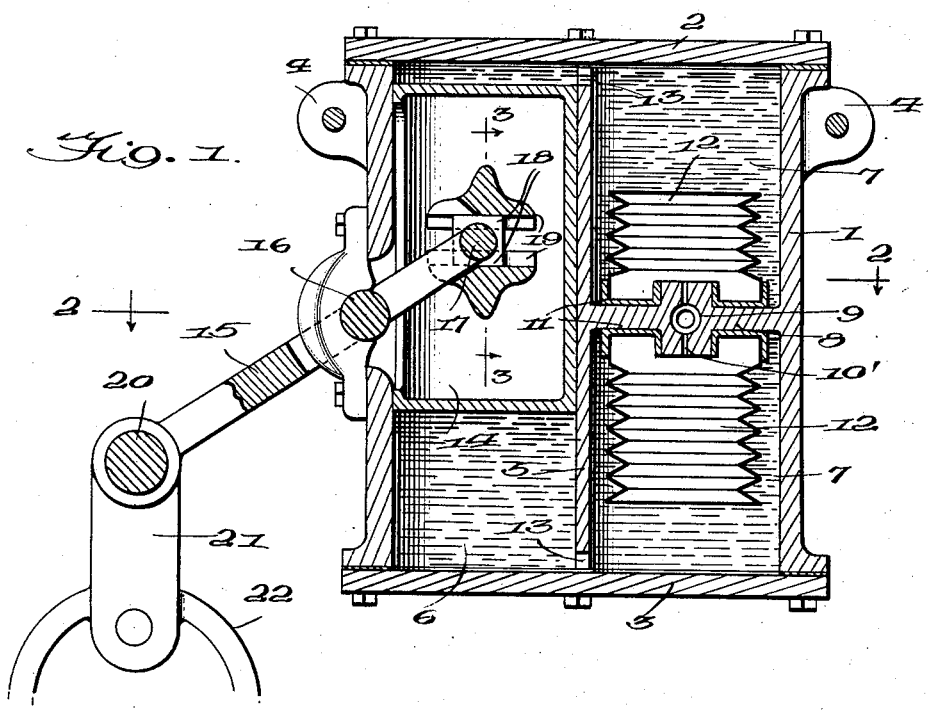
Fig. 1.
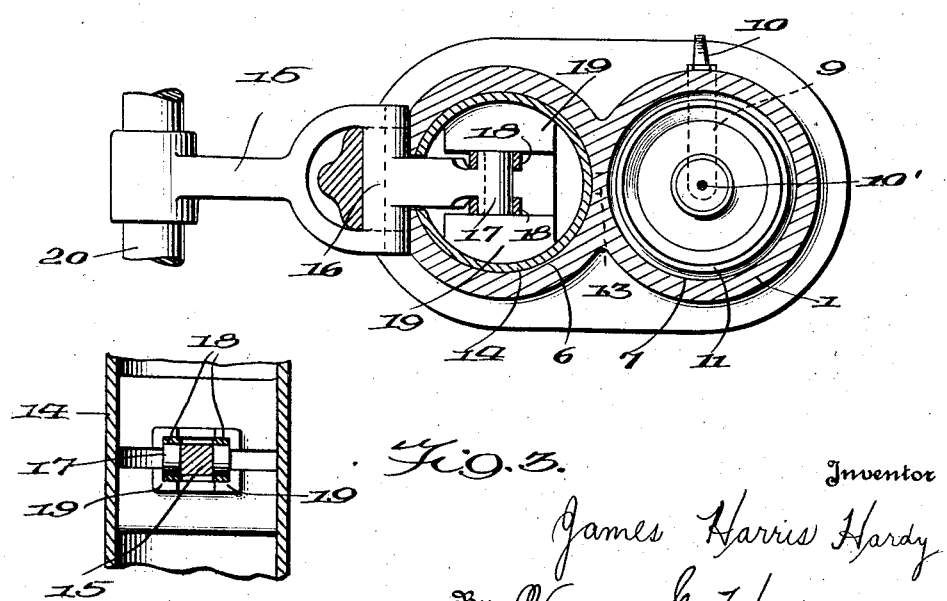
Fig. 2.
Fig. 3.
Inventor
James Harris Hardy
By Vernon C. Hodges
his Attorney Nov. 28, 1933.        J. H. HARDY        1,936,788
SHOCK ABSORBER
Filed Feb. 19, 1931        2 Sheets-Sheet 2
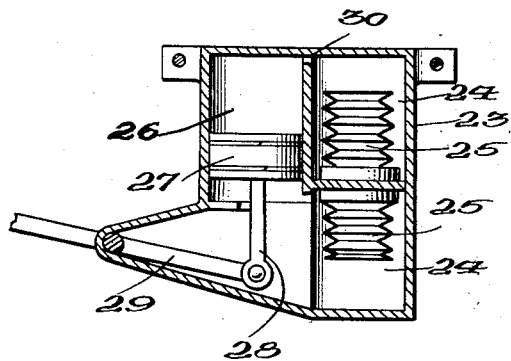
Inventor
James Harris Hardy
By Vernon E. Hodges
his Attorney Patented Nov. 28, 1933

1,936,788

UNITED STATES PATENT OFFICE 1,936,788

SHOCK ABSORBER

James Harris Hardy, Columbus, Miss.

Application February 19, 1931. Serial No. 517,030

9 Claims. (Cl. 188—88)

This invention relates to an improvement in shock absorbers.

The object of the invention is to provide a shock absorber of improved characteristics in a simplified structure that will effectively absorb the shock imparted to it by irregularities in the road surface over which an automobile is traveling, to prevent the transmission of such irregularities to the chassis and frame of the vehicle.

The invention contemplates the use of one or more bellows which are sealed to contain a fixed predetermined normal pressure, and these bellows are acted on by a fluid which is forced thereagainst by the action of a piston, the piston being operatively connected with the axles of the vehicles.

In the accompanying drawings:

Fig. 1 is a sectional view through one form of the shock absorber;

Fig. 2 is a horizontal sectional view therethrough on the line 2—2 of Fig. 1;

Fig. 3 is a detailed sectional view on the line 3—3 of Fig. 1; and

Fig. 4 is a vertical sectional view through a slightly modified form of shock absorber.

In the form shown in Fig. 1, a housing 1 is provided with top and bottom covers 2 and 3 for closing the ends thereof, and this housing is designed to be attached to the chassis of a vehicle in any suitable manner, as by lugs 4, which may be secured directly to the chassis frame.

Within the housing 1 is a partition 5, on one side of which is a cylinder 6 and on the other side of which are two cylinders 7 separated by a transverse partition 8. Extending radially through the partition 8 is an opening 9 controlled by a valve 10 at the side of the housing 1, as shown in Fig. 2, for allowing the introduction of air through this opening 9 and maintaining a predetermined pressure within the chambers 7. The chambers 7 communicate with each other and with the radial opening 9 through orifices 10', which extend axially through the partition 8 from the opening 9.

Cups 11 are fixed on opposite sides of the partition 8, and these cups have bellows 12 fixed thereto, and which bellows have their outer sides sealed and permanently closed to communicate with each other through the orifices 10' and may have predetermined internal pressures maintained therein by forcing in air or other compressible gases through the opening 9. When the valve 10 is closed, the pressures in the bellows 12 are normally maintained constant.

The chambers 7 have their outer ends communicating with the opposite ends of the cylinder 6, through openings 13. A piston 14 is slidably mounted in the cylinder 6, and the spaces not occupied by the piston in the cylinder 6 and the chambers 7 are preferably filled with a liquid, although air may be used if desired in these spaces, but it is preferable to use a liquid so that it will not be compressible and the compression will be taken up by the compressible gas or air in the bellows 12.

A lever 15 is pivoted as at 16 to one side of the casing 1 and carries a pivot-pin 17 at the inner end thereof mounted in bearings 18 slidably mounted in guides 19 fixed to the interior of the piston 14 for lengthwise movement of the piston in the cylinder 6.

The opposite end of the lever 15 has a pivotal connection as at 20 with a link 21 attached to a support 22 serving as a connection with one of the axles of the vehicle. Any other suitable means may be employed, as found desirable, for attaching the lever 15 to the axle.

In the operation of the shock absorber, if the parts are normally in the positions shown in Fig. 1 and shock is imparted to the axle of the vehicle, it causes a rocking of the lever 15 on its pivot 16, forcing the piston 14 downward in the cylinder 6, which forces the fluid from the lower end of the cylinder through the orifice 13 and into the lower chamber 7, compressing the bellows 12 and the air or gas contained therein, which will release the pressure against the bellows 12 in the upper chamber 7 and force the liquid from said chamber into the upper end of the cylinder 6, so that upon the rebound this column of liquid in the upper end of the cylinder will check the same and in that way there will be a resistance offered to the shock in both directions. The orifices 10' are sufficiently small so that the fluid in the bellows is not readily circulated between the two, and there is only a slight leakage from one into the other, and in that way there is a compressing of the gas or air instead of merely a forcing of it into the other bellows.

As the air is compressed in each bellows, it builds up a resistance to the flow of liquid into the chamber, which checks the shock or rebound imparted to the piston 14.

In the form shown in Fig. 4, the casing 23 has the two chambers 24 therein for the bellows 25 and has a cylinder 26, in which a standard type of piston 27 is mounted with a connecting rod 28 connected therewith and is operatively connected with a lever 29 to be connected with an axle of the vehicle. The lower portion of the cylinder 26 has open communication with the lower chamber 24 while the upper end of the cylinder 26 communicates with the upper chamber 24 through an orifice 30. The operation of this type of shock absorber is similar to that described above.

I claim:

1. In a shock absorber, the combination of a casing having a cylinder therein and having at least two chambers communicating with opposite ends of the cylinder, a piston operatively mounted in the cylinder, compressible bellows mounted in the chambers and containing a normally constant internal pressure, and a liquid column interposed between each end of the cylinder and one of the bellows for transmitting movement of the piston to compress the bellows, said bellows having a restricted communicating opening arranged therebetween for allowing only a slow movement of air therethrough, and regulating means communicating with said opening.

2. In a shock absorber, the combination of a casing having a cylinder therein, and having at least two chambers communicating with opposite ends of the cylinder, a piston operatively mounted in the cylinder, and compressible bellows mounted in the chambers, said bellows having a restricted communicating opening arranged therebetween for allowing only a slow air movement therethrough.

3. In a shock absorber, the combination of a casing having a cylinder therein, and having at least two chambers communicating with opposite ends of the cylinder, a piston operatively mounted in the cylinder, compressible bellows mounted in the chambers, and a liquid column interposed between each end of the cylinder and a bellows for transmitting motion of the piston to compress the bellows, said bellows having a restricted communicating opening arranged therebetween for allowing only a slow movement of air therethrough.

4. In a shock absorber, the combination of a casing having a cylinder therein, and having at least two chambers communicating with opposite ends of the cylinder, a piston operatively mounted in the cylinder, compressible bellows mounted in the chambers, and a liquid column interposed between each end of the cylinder and a bellows for transmitting motion of the piston to compress the bellows, said bellows having a communicating opening therebetween.

5. In a shock absorber, the combination of a casing having a cylinder therein, a piston operatively mounted in the cylinder, a liquid column operating against each side of the piston, a compressible fluid chamber operating against the opposite side of each fluid column from the piston, and a communicating opening between the compressible fluid chambers.

6. In a shock absorber, the combination of a casing having a cylinder therein, a piston operatively mounted in the cylinder, a liquid column operating against each side of the piston, and a compressible fluid chamber operating against the opposite side of each fluid column from the piston, said compressible fluid chambers having a restricted communicating opening arranged therebetween for allowing only a slow movement of fluid therethrough.

7. In a shock absorber, the combination of a casing having parallel communicating cylinders therein, a piston operatively mounted in one of said cylinders, a liquid column operating against each side of the piston, the other cylinder having a transverse partition therein, and compressible fluid chambers disposed on opposite sides of the partition and operating against the liquid columns, the partition having a communicating opening therethrough between the compressible fluid chambers.

8. In a shock absorber, the combination of a casing having parallel communicating cylinders therein, a piston operatively mounted in one of the cylinders, a liquid column operating against each side of the piston, the other cylinder having a transverse partition therein intermediate its ends, and compressible bellows mounted on opposite sides of the partition and operating against the liquid columns.

9. In a shock absorber, the combination of a casing having parallel communicating cylinders therein, a piston operatively mounted in one of the cylinders, a liquid column operating against each side of the piston, the other cylinder having a transverse partition therein intermediate its ends, and compressible bellows mounted on opposite sides of the partition and operating against the liquid columns, said partition having a restricted communicating opening extending therethrough between the bellows for allowing only a slow movement of fluid therethrough.

JAMES HARRIS HARDY.